(12) United States Patent
Dogaru et al.

(10) Patent No.: US 11,125,723 B2
(45) Date of Patent: Sep. 21, 2021

(54) EDDY CURRENT TESTING FOR MEASURING RESIDUAL STRESS AROUND COLD-WORKED HOLES

(71) Applicant: Southwest Research Institute, San Antonio, TX (US)

(72) Inventors: Teodor Dogaru, San Antonio, TX (US); Clinton J. Thwing, Bulverde, TX (US); Darryl Wagar, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 120 days.

(21) Appl. No.: 16/774,119

(22) Filed: Jan. 28, 2020

(65) Prior Publication Data

US 2021/0231612 A1 Jul. 29, 2021

(51) Int. Cl.
*G01N 27/904* (2021.01)
*G01B 7/24* (2006.01)

(52) U.S. Cl.
CPC ............. *G01N 27/904* (2013.01); *G01B 7/24* (2013.01)

(58) Field of Classification Search
CPC .......................... G01N 27/72–904; G01B 7/24

USPC .................................................. 324/239–243
See application file for complete search history.

(56) References Cited

U.S. PATENT DOCUMENTS

| 7,817,845 | B2* | 10/2010 | Suh | G01N 27/902 |
| | | | | 324/137 |
| 10,260,854 | B2* | 4/2019 | Zhang | G01B 7/13 |
| 11,054,318 | B2* | 7/2021 | Hassan | G01N 27/90 |
| 2013/0181701 | A1* | 7/2013 | Galbraith | G01N 27/90 |
| | | | | 324/232 |

\* cited by examiner

*Primary Examiner* — Melissa J Koval
*Assistant Examiner* — Rahul Maini
(74) *Attorney, Agent, or Firm* — Livingston Law Firm

(57) ABSTRACT

A method of testing the residual stress around a cold-worked hole in a test material. The test uses two identical eddy current coil pairs, each pair having a driving coil and a pickup coil. One coil pair is placed into the cold-worked hole. The other coil pair is placed into a non-cold worked hole in a reference material. When the coils are activated, and with a properly chosen phase difference between the excitation signal and the output signal, the in-phase component of the output voltage signal can be correlated to residual stress around the cold-worked hole.

13 Claims, 7 Drawing Sheets

EDDY CURRENT TESTING FOR MEASURING RESIDUAL STRESS AROUND COLD-WORKED HOLES

GOVERNMENT SUPPORT CLAUSE

This invention was made with United States Government Support under Contract No. FA8202-09-D-0003 funded by the United States Air Force. The Government has certain rights in this invention.

TECHNICAL FIELD OF THE INVENTION

This invention relates to non-destructive testing of materials, and more particularly to an eddy current testing to determine residual stress around cold-worked holes.

BACKGROUND OF THE INVENTION

A common practice for enhancing fastener holes in metal airframe structures is to cold work the material around the fastener hole. The cold working induces beneficial residual stresses to improve the fatigue life and damage tolerance properties of fastener holes.

More specifically, the cold working process produces residual compressive stresses around the hole, retarding crack initiation and small crack growth that occur and accumulate during service. Accumulated service cracks are referred to as metal fatigue. When cracks accumulate above a particular level, the metal is no longer considered to have adequate structural properties. As aircrafts age, fatigued parts must be repaired or replaced at scheduled service intervals. It is desirable therefore to enhance the fatigue life and thus extend service intervals using a cold working process. Proper qualification ensuring that the process was performed correctly is required in order to credit extended service life estimates.

Cold working is designed to deliver a predicted hole expansion and consequently, a predicted compressive residual stress around the hole. However, steps in the expansion process can fail to deliver the predicted results for a number of reasons, including human errors, worn tooling, or variation in material forming properties.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to an eddy current probe and test method for measuring compressive residual stress around cold-worked fastener holes. It is a non-destructive test method that indirectly measures an average value of the compressive residual stress across a region of about one radius from the hole edge, which is the typical region of compressive residual stress in a cold-worked hole.

The test method measures the electrical conductivity within the region of the residual stress around the hole, which is proportional to the residual stress, due to the piezoresistive effect. This conductively can be compared to a non-cold-worked fastener hole to determine the condition of the cold-worked hole.

Although as stated in the Background, cold-worked holes are typically associated with the aircraft industry and aluminum alloys, the test method may be used with cold-worked holes in other metals. Specifically, the method may be used with various conductive metals, with the highest sensitivity of the probe being for highly conductive metals, such as aluminum and copper. Non-magnetic metals having a strong piezoresistive effect are particularly suitable.

Overview of Eddy Current Testing for Cold-Worked Holes

Figure 1:
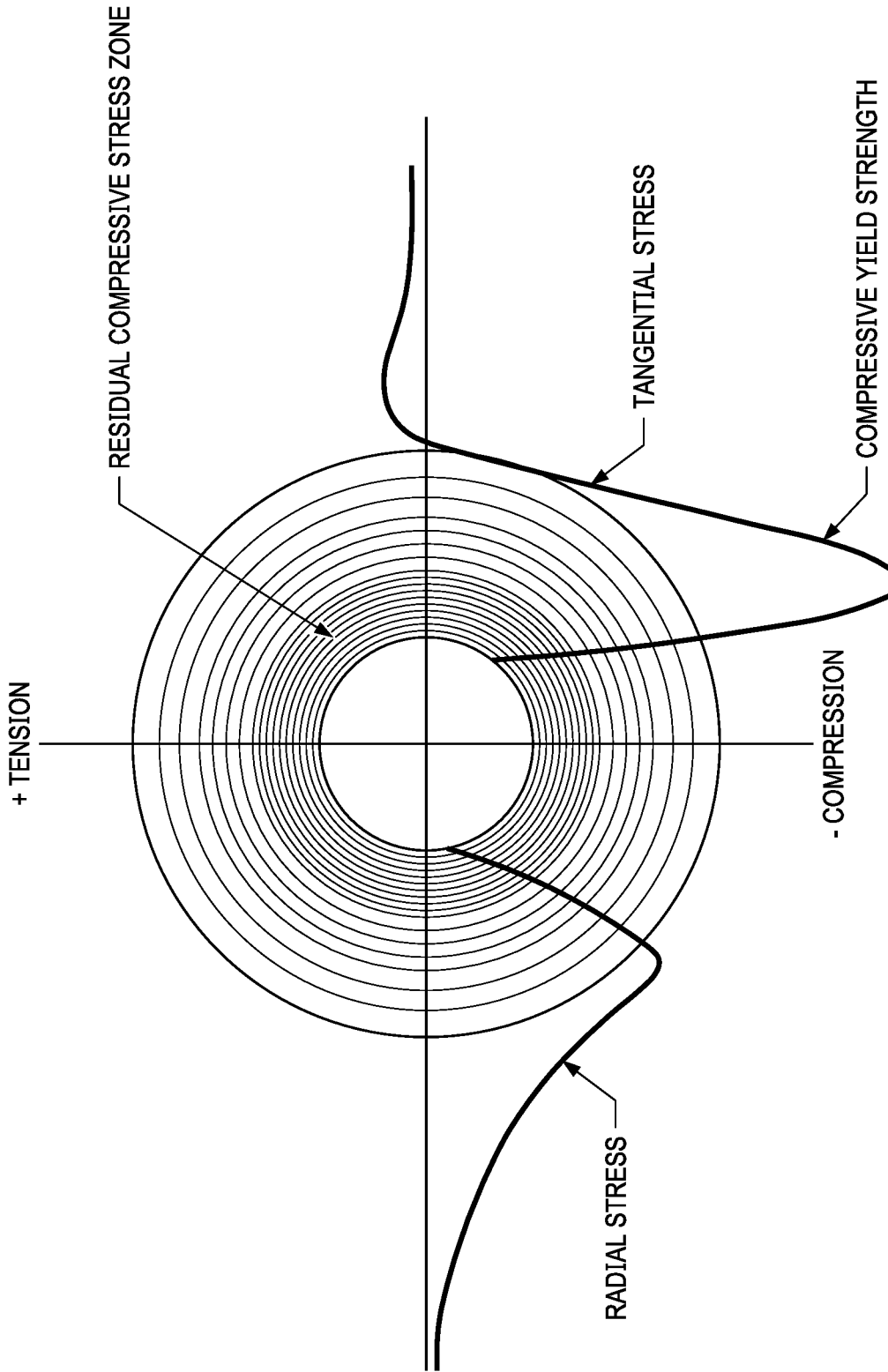
FIG. 1 illustrates a cold-worked hole and the typical distribution of the two components of residual stress (circumferential and radial) around it.

FIG. 1 illustrates a cold-worked hole and the typical distribution of the two components of residual compressive stress (circumferential and radial) around it. The magnitude of the peak residual compressive circumferential stress is about equal to the compressive yield stress for the material. The compressive stress zone spans one radius to one diameter from the edge of the hole. The maximum circumferential residual stress occurs at a radial distance of about 0.5 mm to 1 mm from the edge of the hole, depending on the hole diameter.

The location and distribution of the plastic deformation (cold work) area can be quantified using metallographic micro-hardness techniques. It has been demonstrated that plastic deformation is maximum on the hole edge and decreases linearly with radial distance. The plastic deformation vanishes faster than the residual stress in the radial direction. For example, in the case of shot peened nickel-based superalloy samples, the penetration depth of the cold-worked region is typically about one third of the extent of the compressive residual stress.

It is well known that the electrical conductivity of metals is sensitive to both stress and plasticity. Both residual compressive stress and plastic deformation cause small changes in conductivity in the order of a few percent.

Eddy current testing has the potential to provide a convenient method of evaluating both the residual stress and plastic deformation in cold-worked metals. The challenge is to separate between compressive stresses and plastic deformation in their respective contributions to an eddy current response. By using a directional eddy current probe in absolute mode, the real part of the eddy current response is found to be sensitive mainly to compressive stress. In contrast, the imaginary part of the eddy current response is sensitive mainly to plasticity.

Modeling of Cold-Worked Holes

Figure 2:
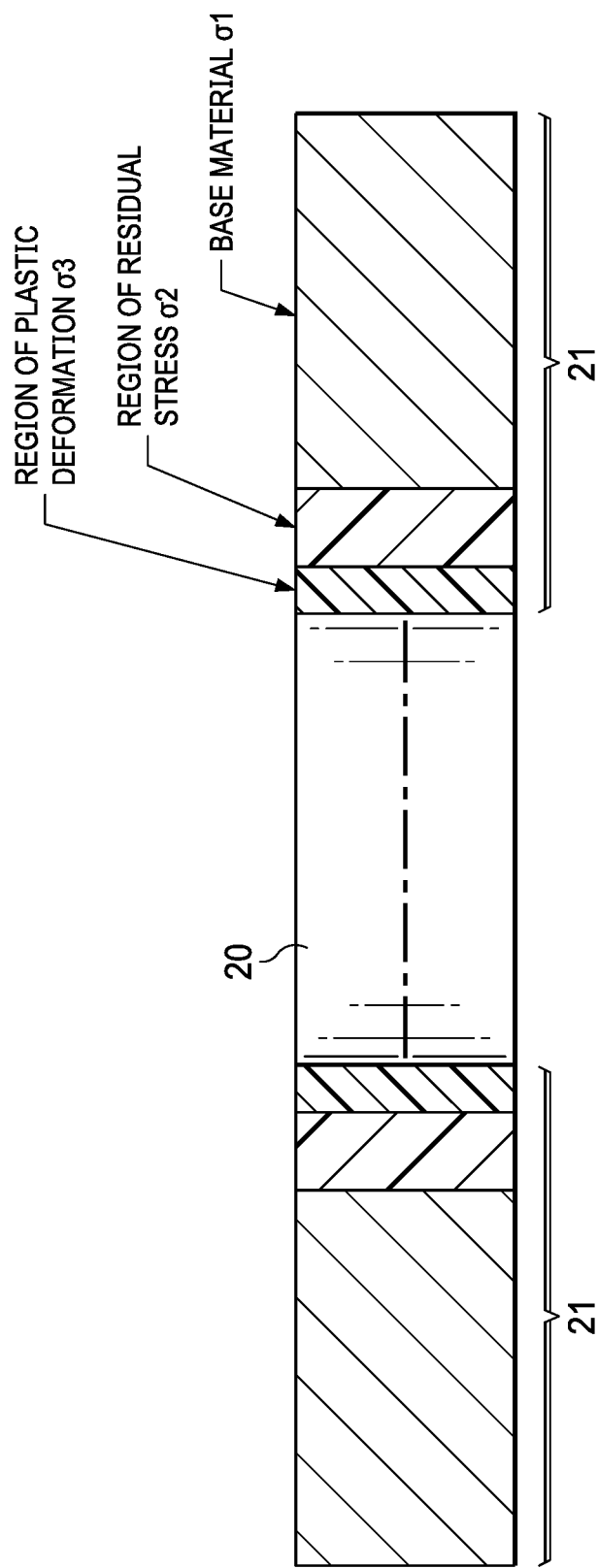
FIG. 2 illustrates a model of a cold-worked hole that separates the two effects of cold working (residual stress and plastic deformation), based on concentric distribution of these effects around the hole.

FIG. 2 illustrates a model of a cold-worked hole 20 in a metal piece 21. The model separates the two effects of cold working (residual stress and plastic deformation), based on the concentric distribution of these effects around the hole.

The regions of metal 21 around the cold-worked hole 20 can be modeled as three coaxial cylindrical conductors of different conductivities. The inner region is a ring of conductivity, $\sigma_3$, where the plastic deformation is predominant. A middle region is a residual stress zone of conductivity, $\sigma_2$, where the plastic deformation is negligible. The outer region is the base material of conductivity, $\sigma_1$.

The width of the inner region extends about one third as compared to the middle region in the radial direction. Although the conductivities across the middle and outer regions vary in the radial direction (because the residual stress and plastic deformation vary), the model considers the average values of conductivities $\sigma_2$ and $\sigma_3$ across the two regions. The conductivity in these regions is related to the base material conductivity $\sigma_1$ as follows:

$$\sigma_2 = \sigma_1 - \Delta\sigma_2$$

$$\sigma_3 = \sigma_1 \pm \Delta\sigma_3$$

The first equation shows that the conductivity in the residual stress area is always smaller than the conductivity of the base material. The circumferential conductivity (in the direction of the eddy currents) decreases linearly with increased circumferential residual stress. In contrast, the conductivity in the plastic deformation area can be either larger or smaller than base material conductivity $\sigma_1$, depending on the type of aluminum alloy and its temper. The values of $\Delta\sigma_2$ and $\Delta\sigma_3$ are very small compared to $\sigma_1$, in the range of a few percent.

As explained below, an eddy current probe can be used to measure electrical conductivity in both areas related to the circumferential residual stress and plastic deformation. The conductivity in the two areas is differentiated, so that residual stress can be measured.

Eddy Current Probe

Figure 3:
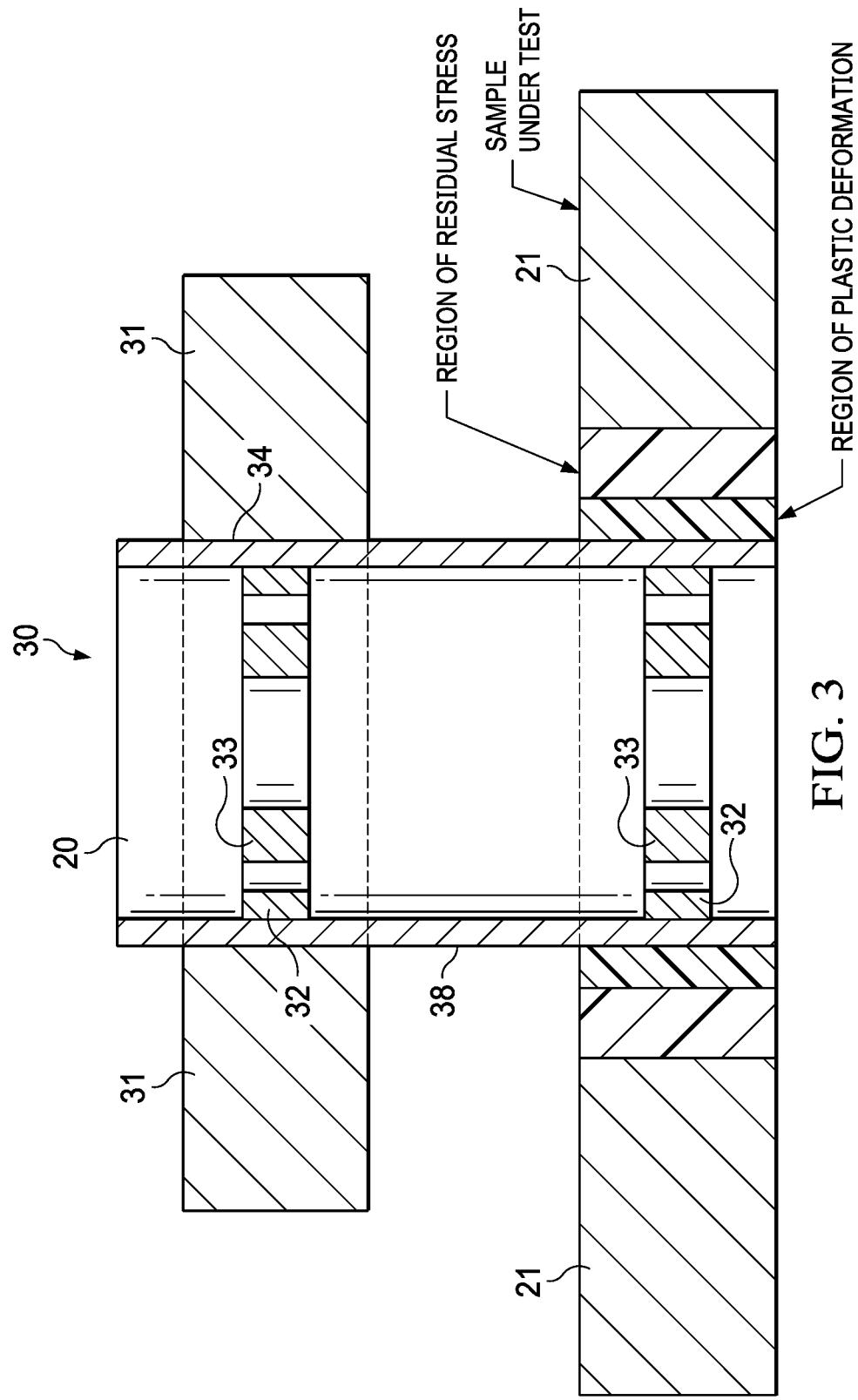
FIG. 3 is a cross sectional view of an eddy current probe for measuring residual stress around a cold-worked hole, inserted into a reference plate and a cold-worked hole.

FIG. 3 illustrates an eddy current probe 30 for measuring residual stress around cold-worked holes in accordance with the invention. Probe 30 is shown in its operative state, inserted into a reference plate 31 and into a cold-worked hole of a metal piece being tested.

The eddy current probe 30 is a four-coil differential probe. It has two identical driving coils 32 and two identical pick-up coils 33. Each driving coil 32 is concentrically arranged with its paired pick-up coil 33. One pair of driving coil 32 and pickup coil 33 is an "upper pair" that activates the reference plate 31. The other pair is a "lower pair" that activates the metal around the cold-worked hole.

For purposes of this description, each pair of driving coil 32 and pickup coil 33 is referred to as an "eddy current coil pair". The coil pairs are identically sized to fit within the circumference of the cold-worked hole, and to generate eddy currents into the metal surrounding the hole.

The pairs of eddy current coils are spaced vertically within a cylindrical probe housing 38, at a sufficient distance to avoid interference between the electromagnetic fields of the two driving coils. The distance between coil pairs and the length of housing 38 is appropriate to allow the portion of the probe containing the lower coil pair to be inserted into a cold-worked hole, for either scanning through the entire hole or being placed at the mid-section of the hole during testing as described below. For testing stacks of cold-worked holes, probe 30 is sufficiently elongated.

The reference plate 31 has the same thickness as the test material 21 and has a hole 34 of same diameter as the cold-worked hole 20. Hole 34 is not cold-worked. The conductivity of reference plate 31 is the same or substantially the same as that of the conductivity $\sigma_1$ of the test material 21. Reference plate 31 is fixed with respect to the upper pair of coils, with its mid-section centered around the upper pair of coils and that portion of the housing 38.

Figure 4:
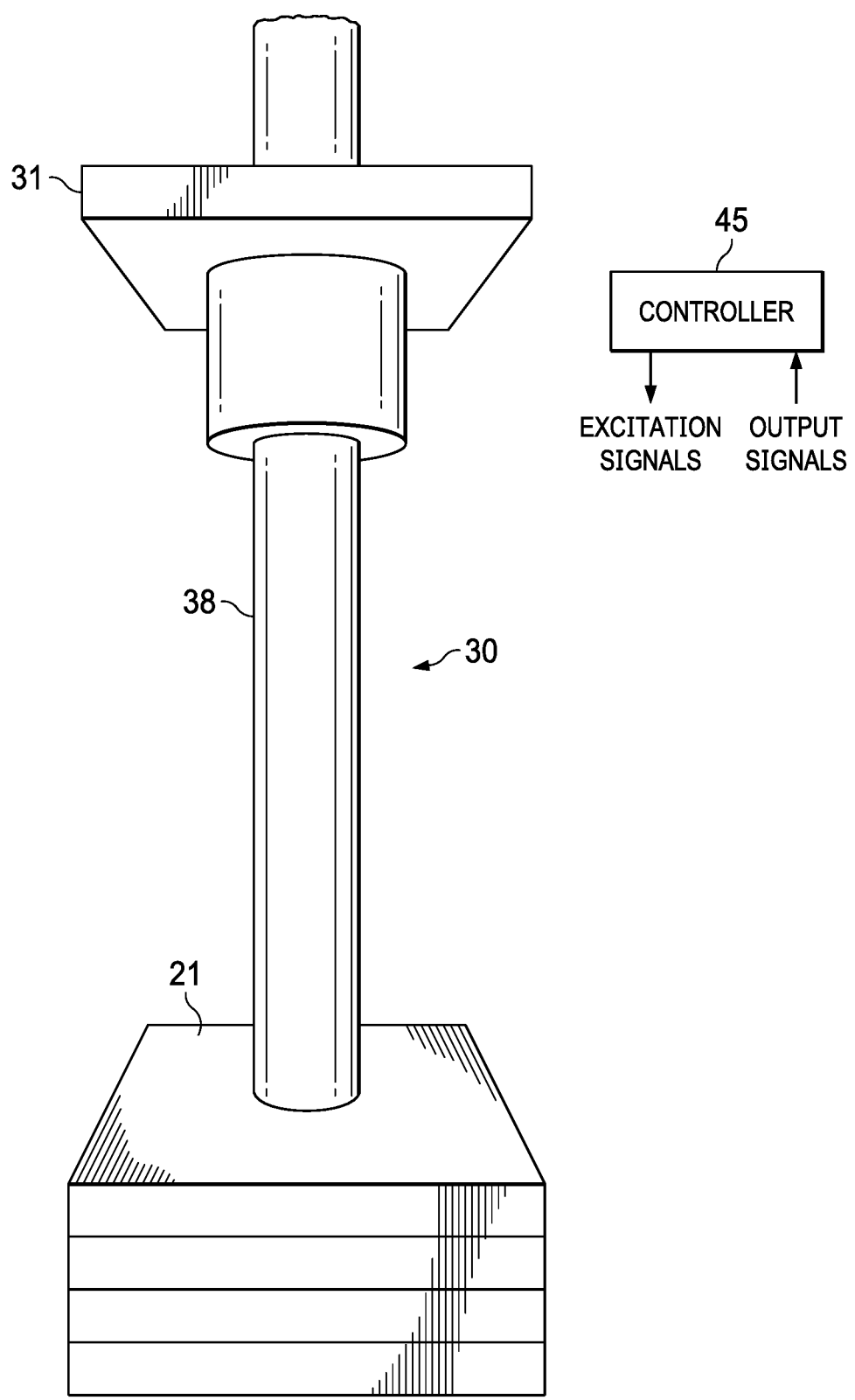
FIG. 4 illustrates the probe in use during inspection of a four-layer stack of samples containing cold-worked holes.

FIG. 4 illustrates probe 30 in use during inspection of a four-layer stack of samples containing cold-worked holes. Referring to both FIGS. 3 and 4, the probe 30 is inserted into hole 34 in reference plate 31, with hole 34 being vertically aligned with hole(s) 20 of the same test material. The cylindrical housing 38 of probe 30 has about the same diameter as the holes of the reference material and the test material, such that probe 30 can slide easily along the holes' inner surface.

FIG. 4 further shows a controller 45 that delivers activation signals to the probe driving coils and receives response signals representing current and voltage from the pickup coils. Controller 45 has appropriate hardware and/or software to perform these tasks and may also be programmed to process and analyze the response signals as explained below.

In air, the driving coils 32 induce equal voltages in the pickup coils 33 such that the output voltage of the probe 30 is zero. When the lower pair of driving coil 32 and pickup coil 33 is inserted into the cold-worked fastener hole 20, the output voltage, $V_{out1}$, of the lower pickup coil 33 is:

$$V_{out1} = V_{coil1} - V_{EC\_CW},$$

where $V_{coil1}$ is the voltage induced by the lower driving coil 32 and $V_{EC\_CW}$ is the voltage induced by the eddy currents flowing around the cold-worked hole 20.

The output voltage $V_{out2}$ of the upper pickup coil 33 can be written as:

$$V_{out2} = V_{coil2} - V_{EC\_REF},$$

where $V_{EC\_REF}$ is the voltage induced in the upper pickup coil 33 by eddy currents flowing in the reference material 31, which is constant (for a given frequency). Because the two driving coils are identical, $V_{coil1} = V_{coil2}$. Therefore, the output voltage of the four-coil probe is:

$$V_{out} = V_{out2} - V_{out1} = V_{EC\_CW} - V_{EC\_REF} = EC\_CW - k$$

After quadrature synchronous demodulation, the output voltage amplitude of the probe 30 has two components: the in-phase output voltage $V_x$ and the out-of-phase (quadrature) output voltage $V_y$:

$$V_{out} = V_x - jV_y$$

The in-phase component $V_x$ has the same phase as a reference signal, which is the input current applied to the driving coils 32. The output voltage $V_{out}$ is a phasor in the complex plane that can be rotated by a phase angle $\theta$ with respect to the reference signal. Because of the phasor rotation, the components $V_x$ and $V_y$ change as the phase angle $\theta$ varies.

Correlation of Probe Output Voltage and Eddy Current Density

As shown above, the output of the probe 30 is the voltage induced in the lower pickup coil 33 by eddy currents flowing around the cold-worked hole 20. From Faraday's law, the induced voltage in the pickup coil 33 can be written as:

$$V_{out} = -\frac{d}{dt}\oiint_A B_{EC} dS,$$

where $B_{EC}$ is the magnetic field created by eddy currents and A is the cross-section area of the pickup coil 33. In the case of a sinusoidal excitation signal of frequency f, and considering the magnetic field constant across the area A of the pickup coil 33, the amplitude of the output voltage in absolute value is:

$$|V_{out}| \cong 2\pi^2 f r_m |B_{EC}|$$

where $r_m$ is the mean radius of the pickup coil 33.

The magnetic field inside pickup coil 33 created by eddy currents can be calculated from Biot-Savart law. Similar to the problem of the magnetic field created in the center of a current loop, the magnetic field inside the pickup coil 33 can be approximated as follows:

$$|B_{EC}| \cong \frac{\mu_0 I}{2R} = \frac{\mu_0}{2R} \int \int |J_{EC}| dr dz,$$

where $J_{EC}$ is the eddy current density around the hole, and R is the hole radius. From the above two equations, it follows that:

$$|V_{out}| \propto \int_R^\infty |J_{EC}| dr$$

In conclusion, the output voltage of the pickup coil 33 is proportional to the integral of the eddy current density along the radial distance.

Similar to the output voltage, the eddy current density has two components in quadrature: the in-phase eddy current density $J_{ECx}$, and the out-of-phase (quadrature) eddy current density $J_{ECy}$. From the equation above, it follows that:

$$V_x \propto \int_R^\infty |J_{ECx}| dr; V_y \propto \int_R^\infty |J_{ECy}| dr;$$

Therefore, the in-phase $V_x$ and quadrature $V_y$ output voltages of the probe 30 can be estimated by studying the distribution of the two components of the eddy current density around the hole 20 in the radial direction. As in the case of $V_x$ and $V_y$, the eddy current density components $J_{ECx}$ and $J_{ECy}$ depend on the phase angle θ with respect to the reference signal.

Detection of Residual Stress and Plastic Deformation from Eddy Current Response

Modeling and simulation of the eddy current distribution created by probe 30 inside a cold-worked hole indicates a close similarity between the radial distribution of the in-phase eddy current density and circumferential residual stress around the hole. At the same time, there is a similarity between the distribution of the out-of-phase eddy current density and the plastic deformation around the hole.

The frequency and the phase angle θ can be adjusted such that the in-phase eddy current density $J_{ECx}$ is null at the hole edge, and has a maximum value at the same radial distance at which the residual stress is maximum. In this case, the in-phase eddy currents flow mainly within the area of residual stress, having about the same intensity profile as the residual stress. Consequently, the in-phase output voltage $V_x$, which is proportional to the integral of the in-phase eddy current density over the radial distance, will measure the circumferential residual stress around the hole. At the same time, because the in-phase current density $J_{ECx}$ is zero at the hole edge (where the plastic deformation is maximum), the in-phase output voltage is insensitive to the plastic deformation around the hole.

In this way, the residual stress and plastic deformation can be separated by monitoring the quadrature output voltages $V_x$ and $V_y$. The in-phase output $V_x$ measures only the residual stress, while the out-of-phase output $V_y$ measures mainly the plastic deformation.

Experimental Results

Experimentation was performed with cold-worked samples, using probe 30 to detect and measure the circumferential residual stress around the holes. For purposes of example, results from one experiment are discussed below.

The sample material had a thickness of 0.25 inch (6.3 mm) and contained a hole of 0.5 inch (12.6 mm) in diameter. The material was an aluminum alloy (Al 2024). A set of three samples was provided: a sample with no cold-worked hole, a sample with a low cold expansion hole, and a sample with a high cold expansion hole.

A reference sample made of Al 2024 alloy was used in all measurements. The reference sample had the same thickness as the samples under test (0.25 inch) and a hole of 0.5 inch in diameter that was not cold-worked.

For each sample separately, probe 30 was inserted and scanned through the sample hole. The reference plate 31 is fixed with respect to the upper pair of coils. with the reference sample being fixed with respect to its associated upper pair of coils. A sinusoidal current of 300 mA in amplitude at a frequency of 30 kHz was run through the driving coils of the probe 30. The differential output signal was amplified and synchronously detected using a quadrature demodulator. The in-phase and out-of-phase output voltages were obtained in this way. The phase angle θ between the detected signals and the excitation signal (the current through the driving coils) was adjusted to 30 degrees. At this phase, the in-phase output voltage $V_x$ measures the residual stress only, being insensitive to the plastic deformation.

The probe 30 was scanned by pulling the lower pair of driving coil 32 and pickup coil 33 through the hole of the sample under test. The output voltage of the probe 30 when the lower pair of coils 32 and 33 crossed the mid-section of the samples was recorded.

Figure 5:
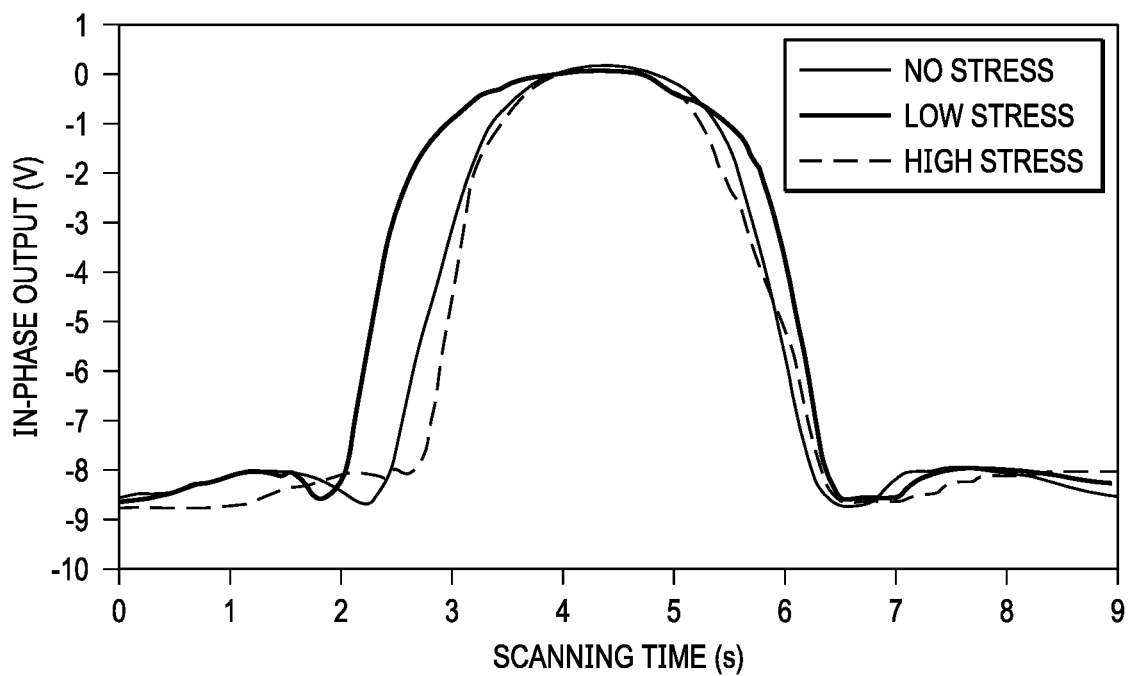
FIG. 5 illustrates an example of the in-phase output voltage of the probe when scanning two variations of a cold-worked hole and a non cold-worked hole.
Figure 6:
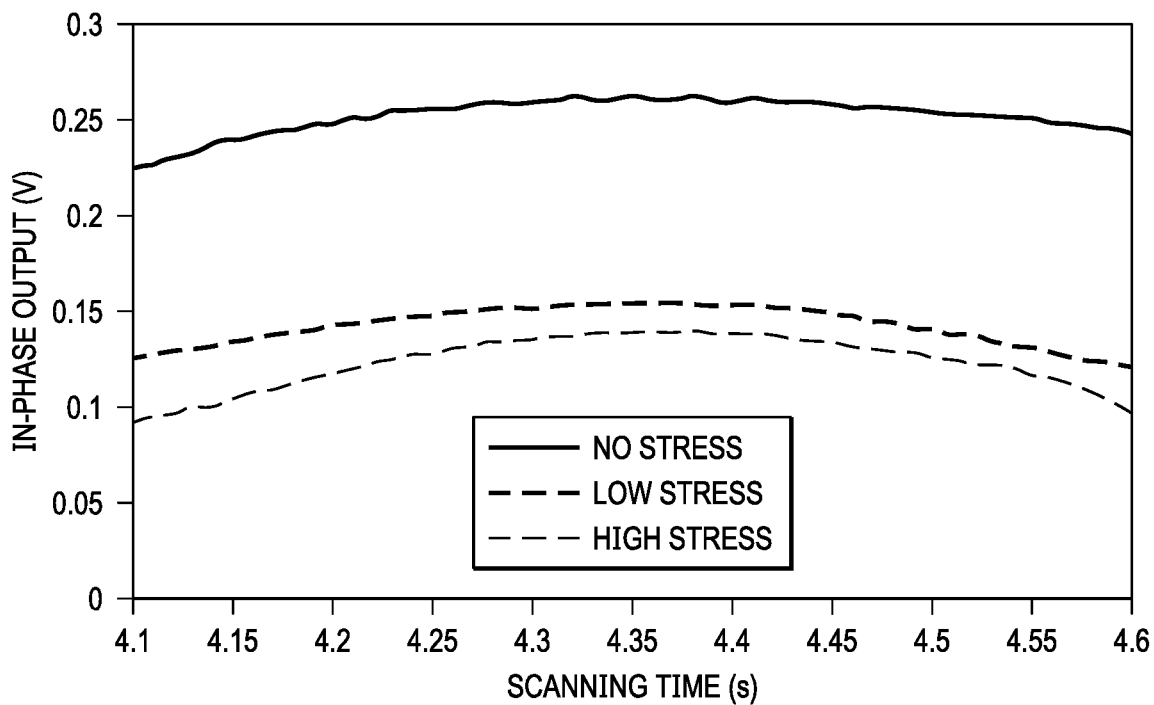
FIG. 6 is a magnified view of FIG. 5, showing the output voltage as the pair of coils crosses the mid-section of the layer thickness, where a maximum voltage is obtained.

FIGS. 5 and 6 illustrate the results of scanning the probe through each sample, in terms of the in-phase output voltage. These results display the in-phase output voltage versus time as the lower pair of coils passes through the hole. FIG. 6 is a magnified view of FIG. 5, showing the output voltage as the pair of coils crosses the mid-section of the layer thickness, where a maximum voltage is obtained.

The results show a decrease in the in-phase output voltage for the cold-worked samples compared to the sample that were not cold-worked. Also, the output voltage for the high cold-worked holes is lower than the output voltage for low cold-worked holes. The results reflect a decrease in the electrical conductivity ($\Delta\sigma_2$) due to circumferential residual stress. The in-phase output voltage decreases when the conductivity $\sigma_2$ is decreased due to the residual stress.

The experimental results showed that the in-phase-output voltage difference between high expansion cold work hole and non-cold-worked hole was 130 mV. The noise level of the output voltage is about 2 mV. Therefore, the residual stress is detected with a signal-to-noise ratio higher than 60. The difference in output voltage of 130 mV corresponds to a conductivity change due to residual stress of about 2%.

In addition, it is possible to distinguish between the low and the high cold-worked samples. A difference in the in-phase output voltage of 20 mV was obtained.

Experimentation with other aluminum alloys showed similarly favorable results for testing with probe 30.

Probe 30 can further be used to test multiple cold-worked holes. Layers of test material, each having a cold-worked hole are stacked, with their cold-worked holes arranged concentrically. Probe 30 is inserted down through the stack, through each of the cold-worked holes.

Figure 7:
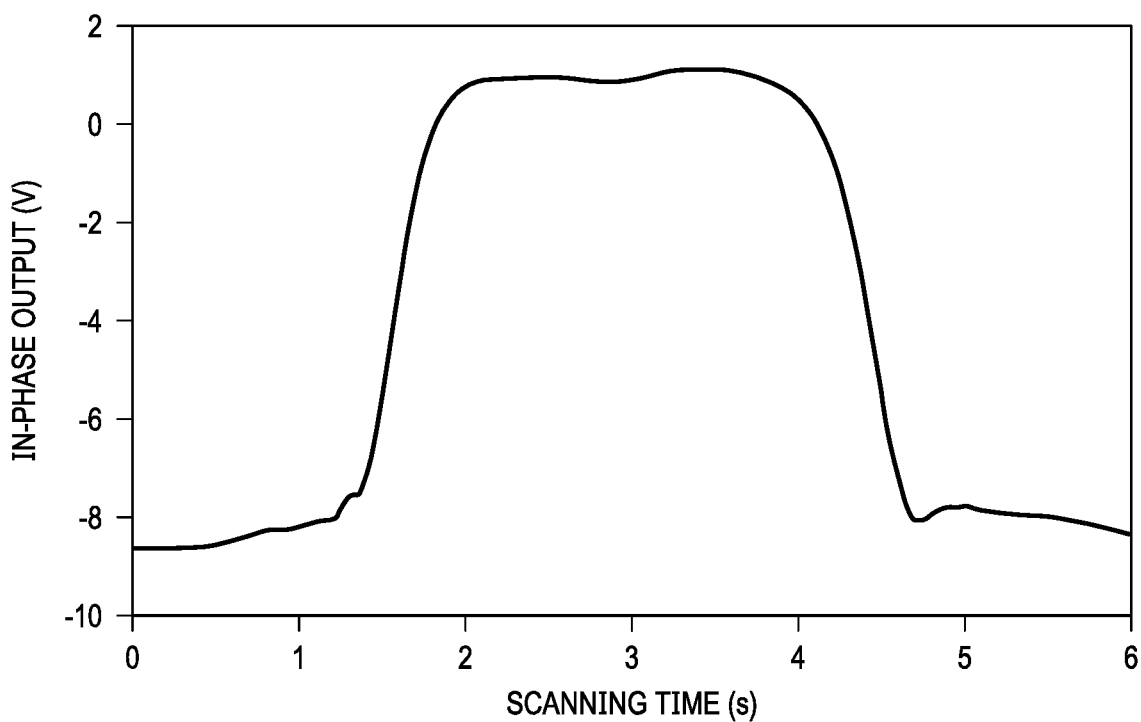
FIG. 7 illustrates an example of the in-phase output voltage of the probe when scanning a stack of two cold-worked holes.
Figure 8:
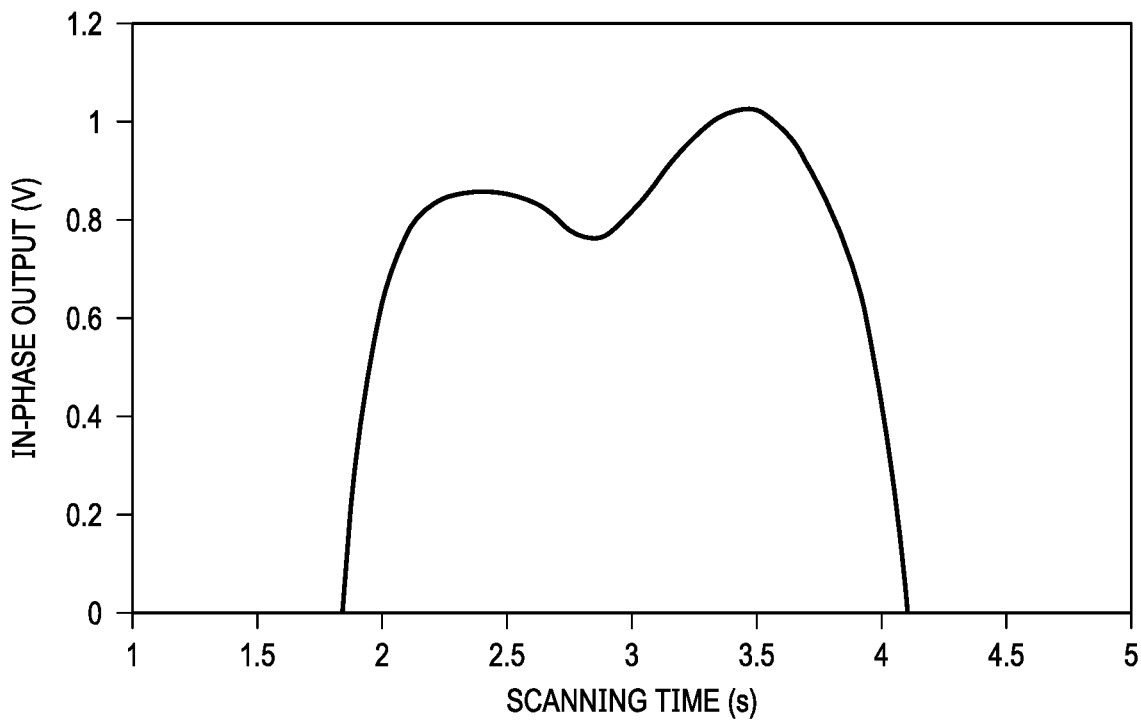
FIG. 8 is a magnified view of FIG. 7, showing the output voltage as the pair of coils crosses the mid-section of the layer thickness, where a maximum voltage is obtained.

FIGS. 7 and 8 illustrate results of experimentation with multi-layer stacks of cold-worked hole samples. For FIGS. 7 and 8, a two-layer stack comprising the high cold-expansion sample and the non-cold-worked sample of the Al 2024 set of samples was tested. FIGS. 7 and 8 are scan results for the in-phase output voltage, with FIG. 8 being a magnified view of the two peaks of FIG. 7 corresponding the mid-section of each sample. The first peak (left) corresponds to the high cold-expansion layer, while the second peak (right) corresponds to the no cold-worked layer. The difference between the two peak values was about 170 mV. As in the case of single-layer testing, the in-phase output voltage for the cold-worked sample is lower due to decreased conductivity.

As is evident from the above data, scanning the probe through a cold-worked hole is useful to detect variations of residual stress in the scanning direction (over the thickness of the test material). In other embodiments, rather than being scanned through the cold-worked hole under test, probe 30 could be used to collect measurement data while in a fixed position within the test hole, typically at the hole's mid-section. The probe 30 is otherwise used as described above, with reference plate 31 being fixed around the upper coil pair.

Generalized Test Method

The test method described above can also be used with two pairs of coils that are not integrated into a single probe 30. For this method, the two pairs of coils are configured as separate probes. Each probe has a pair of coils in a cylindrical housing with a slightly smaller diameter than the test hole.

A first probe is an active probe, inserted into the cold-worked hole being tested. In operation, it can be scanned through the test hole or placed within the mid-section of the hole, as described above.

A second probe is a reference probe, with its coil pair fixed within a non cold-worked hole in the reference material at the mid-section of the hole. The second (reference) probe can be remote from the test material.

The probes are electrically connected, so that the measurement data can be collected and analyzed as described above.

Figure 9:
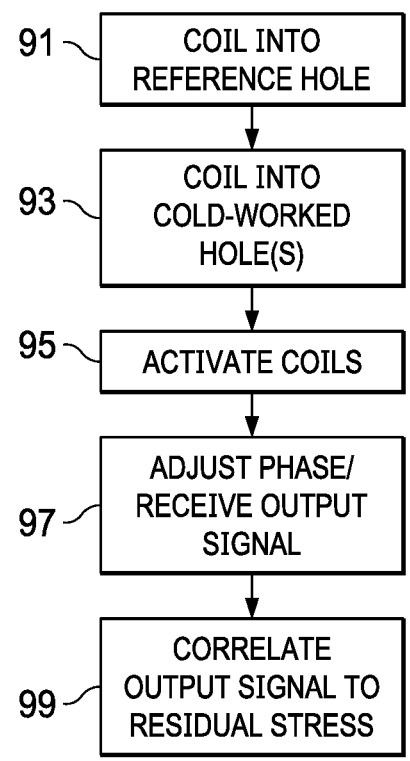
FIG. 9 illustrates a method of testing the residual stress around a cold-worked hole.

FIG. 9 illustrates a method of testing for residual stress around a cold-worked hole. In Steps 91 and 93, eddy current coil pairs are placed into a non cold-worked hole in a reference piece and a cold-worked hole as described above. The coil pairs may be integrated into a single probe, such as probe 30, or may be configured as separate probes.

In Step 95, the driving coils of both coil pairs are electrically activated. Measurements may be taken during a scan through the cold-worked hole, or while the coil pair of the cold-worked pair is at the mid-section of the cold worked hole.

The measurements may be taken for a single layer with a cold-worked hole. Or, measurements may be taken through a stack of layers having cold-worked holes concentrically aligned.

In Step 97, the output signal is received from the pickup coils of the coil pairs. The difference between the phase of the driving signal and the phase of the output signal is adjusted. It should be noted that the phase angle can be adjusted either before measurements are taken, or it can be adjusted as a processing step during analysis of the measurement results. The selection of the phase angle is discussed above, with modeling used to determine a phase angle where the in-phase eddy current density is zero at the hole edge and maximum where the residual stress is maximum in the radial direction.

In Step 99, the output signal is analyzed to correlate the output voltage to residual stress around the cold-worked hole. It can then be determined whether the hole was properly cold-worked.

Conclusions

The test method described above, using probe 30 or separated probes, is capable of measuring small changes in conductivity caused by circumferential residual stress around cold-worked holes. Activated with an input signal having properly chosen frequency and phase angle, the in-phase output signal decreases when the residual stress increases.

The out-of-phase output signal measures the change in conductivity caused by plastic deformation around the hole. The plastic deformation does not influence the in-phase output signal that measures the circumferential residual stress.

The test method provides validation of cold-worked fastener holes, on a per hole basis, to verify that compressive residual stress was achieved as intended. Preliminary tests demonstrate that the probe can resolve relative changes in electrical conductivity in the order of 0.1%, which corresponds to residual stress levels well below the threshold of 15 ksi. It can also discriminate between holes of different degrees of cold work expansion, that is, between varying degrees of low and high cold-worked holes. The inspection time is about 10 seconds per hole.

What is claimed is:

1. A method of testing residual stress around a cold-worked hole in a test material, comprising:
   placing a first eddy current coil pair into the cold-worked hole;
   placing a second eddy current coil pair into a non- cold worked hole in a reference material of the same or substantially the same conductivity as the test material;
   wherein the first eddy current coil pair and the second eddy current coil pair are identical, and each has a driving coil and a pickup coil;
   activating the driving coils with an excitation signal;
   receiving an output voltage signal from the first eddy current coil pair and the second eddy current coil pair, representing a difference between the voltages induced in the pickup coil of the first eddy current coil pair and the pickup coil of the second eddy current coil pair;
   wherein the output voltage signal and the excitation signal have a predetermined phase difference; and
   correlating an in-phase component of the output voltage signal with the residual stress around the cold-worked hole.

2. The method of claim 1, wherein the placing step is performed by scanning the first coil pair through the cold-worked hole and the receiving step is performed during the scanning.

3. The method of claim 1, wherein the placing step is performed by placing the first coil pair within the mid-section of the cold-worked hole.

4. The method of claim 1, wherein the predetermined phase difference is such that the excitation signal has a phase relative to a phase angle of the output signal such that an in-phase eddy current density of the output signal is zero at an edge of the cold-worked hole and maximum at a same radial distance where the residual stress is maximum.

5. The method of claim 1, wherein the placing steps are performed with a probe containing both of the coil pairs.

6. The method of claim 1, wherein the coil pairs are configured as separate probes.

7. The method of claim 1, wherein the step of placing a first eddy current coil pair into the cold-worked hole is performed for a stack of layers, each having a cold-worked hole, with the cold-worked holes being concentrically arranged, and wherein the correlating step is performed for at least one of the cold-worked holes of the stack of layers.

8. A probe for testing residual stress around a cold-worked hole in a test material, comprising:
a first eddy current coil pair;
a second eddy current coil pair;
wherein the eddy current coil pairs are identical, and each eddy current coil pair has a driving coil and a pickup coil;
a cylindrical housing containing the eddy current coil pairs spaced a distance apart such that electromagnetic fields from the two coil pairs do not interfere when the eddy current coil pairs are activated;
a reference plate fixed around the cylindrical housing and around the second eddy current coil pair within the cylindrical housing;
wherein the first eddy current coil pair is sized to generate eddy currents in the test material around the cold-worked hole when the first eddy current coil pair is placed within the cold-worked hole, and the second eddy current coil pair is sized to generate eddy currents in the reference plate, when the eddy current coil pairs are activated; and
wherein the reference plate has the same or substantially the same conductivity as the test material.

9. The probe of claim 8, wherein the cold-worked hole has a known circumference and a circumference of the cylindrical housing is only sufficiently smaller than the known circumference of the cold-worked hole to allow the probe to be inserted into the cold-worked hole.

10. A test system for testing residual stress around a cold-worked hole in a test material, comprising:
a probe comprising a first eddy current coil pair; a second eddy current coil pair;
wherein the eddy current coil pairs are identical and each eddy current coil pair has a driving coil and a pickup coil; a reference plate fixed around the second eddy current coil pair; wherein the first eddy current coil pair is sized to generate eddy currents in the test material around the cold-worked hole when the first eddy current coil pair is placed within the cold-worked hole and the second eddy current coil pair is sized to generate eddy currents in the reference plate when the eddy current coil pairs are activated; and wherein the reference plate has the same conductivity as the test material; and
a controller configured to receive an output voltage signal from the first eddy current coil pair and the second eddy current coil pair, representing a difference between the voltages induced in the pickup coil of the first eddy current coil pair and the pickup coil of the second eddy current coil pair; wherein the output voltage signal and the excitation signal have a predetermined phase difference;
and to correlate an in-phase component of the output voltage signal with the residual stress in the test material around the cold-worked hole.

11. The test system of claim 10, further comprising a cylindrical housing containing the eddy current coil pairs in a vertical configuration and spaced a distance apart such that electromagnetic fields from the two coil pairs do not interfere when the eddy current coil pairs are activated.

12. The test system of claim 10, wherein the first eddy current coil pair and the second eddy current coil pair are housed in separate housings.

13. The test system of claim 10, wherein the controller is further configured to calculate the predetermined phase difference such that the excitation signal has a phase relative to a phase angle of the output signal such that an in-phase eddy current density of the output signal is zero at an edge of the cold-worked hole and maximum at a same radial distance where the residual stress is maximum.

* * * * *